(12) United States Patent
Matsumoto et al.

(10) Patent No.: US 9,543,618 B2
(45) Date of Patent: Jan. 10, 2017

(54) SECONDARY BATTERY

(75) Inventors: Kazuaki Matsumoto, Tokyo (JP); Daisuke Kawasaki, Tokyo (JP); Masahiro Suguro, Tokyo (JP); Midori Shimura, Tokyo (JP); Yoko Hashizume, Tokyo (JP)

(73) Assignee: NEC CORPORATION, Tokyo (JP)

( * ) Notice: Subject to any disclaimer, the term of this patent is extended or adjusted under 35 U.S.C. 154(b) by 723 days.

(21) Appl. No.: 13/820,412

(22) PCT Filed: Jul. 15, 2011

(86) PCT No.: PCT/JP2011/066201
§ 371 (c)(1),
(2), (4) Date: Mar. 1, 2013

(87) PCT Pub. No.: WO2012/029420
PCT Pub. Date: Mar. 8, 2012

(65) Prior Publication Data
US 2013/0164604 A1 Jun. 27, 2013

(30) Foreign Application Priority Data

Sep. 2, 2010 (JP) .................................. 2010-196625

(51) Int. Cl.
*H01M 10/0569* (2010.01)
*H01M 10/056* (2010.01)
(Continued)

(52) U.S. Cl.
CPC ......... *H01M 10/0569* (2013.01); *H01M 4/134* (2013.01); *H01M 4/386* (2013.01);
(Continued)

(58) Field of Classification Search
CPC .......................... H01M 4/134; H01M 10/0569
(Continued)

(56) References Cited

U.S. PATENT DOCUMENTS

| 6,800,400 B2 | 10/2004 | Ota et al. |
| 2006/0166098 A1 | 7/2006 | Tabuchi et al. |
| (Continued) | | |

FOREIGN PATENT DOCUMENTS

| JP | 6-325765 A | 11/1994 |
| JP | 10-223257 A | 8/1998 |
| (Continued) | | |

OTHER PUBLICATIONS

Communication dated Jun. 30, 2015 from the Japanese Patent Office issued in the corresponding application No. 2012531737.

*Primary Examiner* — Basia Ridley
*Assistant Examiner* — James Erwin
(74) *Attorney, Agent, or Firm* — Sughrue Mion, PLLC

(57) ABSTRACT

An objection is to provide a high performance secondary battery having good flame retardancy and cycle properties. The present exemplary embodiment provides a secondary battery comprising an electrode assembly in which a positive electrode and a negative electrode are arranged to face each other, an electrolyte liquid and a package accommodating the electrode assembly and the electrolyte liquid, wherein the negative electrode is formed by binding a negative electrode active substance comprising a metal (a) capable of being alloyed with lithium, a metal oxide (b) capable of occluding and releasing lithium ions and a carbon material (c) capable of occluding and releasing lithium ions, to a negative electrode current collector, with a negative electrode binder, and the electrolyte liquid comprises a supporting salt and an electrolytic solvent, the electrolytic solvent comprising at least one phosphate ester compound selected from phosphite esters, phosphonate esters and bisphosphonate esters.

13 Claims, 1 Drawing Sheet

(51) Int. Cl.
*H01M 4/134* (2010.01)
*H01M 4/38* (2006.01)
*H01M 4/48* (2010.01)
*H01M 4/62* (2006.01)
*H01M 10/0525* (2010.01)
*H01M 10/0568* (2010.01)
*H01M 10/0585* (2010.01)
*H01M 10/42* (2006.01)
*H01M 2/02* (2006.01)

(52) U.S. Cl.
CPC ............ *H01M 4/48* (2013.01); *H01M 4/622* (2013.01); *H01M 10/056* (2013.01); *H01M 10/0525* (2013.01); *H01M 10/0568* (2013.01); *H01M 10/0585* (2013.01); *H01M 10/4235* (2013.01); *H01M 2/0275* (2013.01); *H01M 2/0287* (2013.01); *Y02E 60/122* (2013.01); *Y02T 10/7011* (2013.01)

(58) Field of Classification Search
USPC ........................................................ 429/163
See application file for complete search history.

(56) References Cited

U.S. PATENT DOCUMENTS

| | | | | |
|---|---|---|---|---|
| 2007/0148555 A1* | 6/2007 | Fukaya | ............ | H01M 10/0569 429/331 |
| 2009/0297929 A1* | 12/2009 | Uchida | ............ | H01M 10/0431 429/94 |
| 2010/0047695 A1* | 2/2010 | Smart | ............... | H01M 10/0567 429/307 |
| 2010/0055563 A1* | 3/2010 | Nakanishi | ............ | H01M 4/364 429/209 |

FOREIGN PATENT DOCUMENTS

| | | |
|---|---|---|
| JP | 10223251 A | 8/1998 |
| JP | 2002-280061 A | 9/2002 |
| JP | 2002-319431 A | 10/2002 |
| JP | 2003-123740 A | 4/2003 |
| JP | 2004-14351 A | 1/2004 |
| JP | 2004-47404 A | 2/2004 |
| JP | 2004-139886 A | 5/2004 |
| JP | 2005-149957 A | 6/2005 |
| JP | 2007123097 A | 5/2007 |
| JP | 2007-311279 A | 11/2007 |
| JP | 2007299542 A | 11/2007 |
| JP | 2008-21560 A | 1/2008 |
| JP | 2008-84562 A | 4/2008 |
| JP | 2008085462 A | 4/2008 |
| JP | 2009224258 A | 10/2009 |
| JP | 2009-289557 A | 12/2009 |

\* cited by examiner

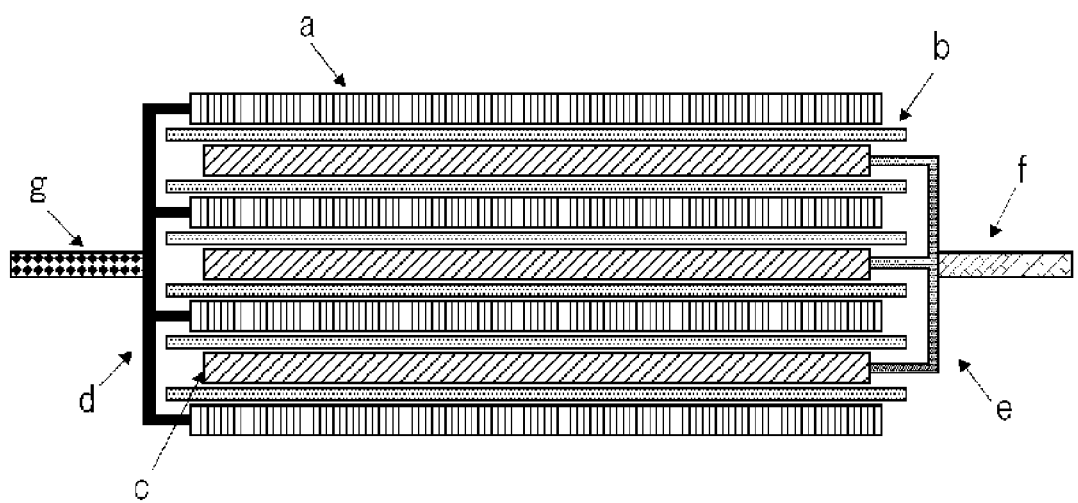

SECONDARY BATTERY

CROSS REFERENCE TO RELATED APPLICATIONS

This application is a National Stage of International Application No. PCT/JP2011/066201, filed on Jul. 15, 2011, which claims priority from Japanese Patent Application No. 2010-196625, filed on Sep. 2, 2010, the contents of all of which are incorporated herein by reference in their entirety.

TECHNICAL FIELD

The present exemplary embodiment relates to a secondary battery and in particular to a lithium ion secondary battery.

BACKGROUND ART

A secondary battery having high energy density is needed due to the rapid expansion of the market of notebook computers, mobile phones, electric cars and the like. As a method for obtaining a secondary battery having high energy density, there has been known a method of using a high capacity negative electrode material, a method of using a non-aqueous electrolyte liquid having good stability, or the like.

Patent document 1 discloses using a silicon oxide or a silicate as a negative electrode active substance for a secondary battery. Patent document 2 discloses a negative electrode for a secondary battery provided with an active substance layer comprising a carbon material particle that can absorb and desorb lithium ions, a metal particle that can be alloyed with lithium and an oxide particle that can absorb and desorb lithium ions. Patent document 3 discloses a negative electrode material for a secondary battery which is formed by coating the surface of particle, which has a structure in which a silicon fine crystal is dispersed in a silicon compound, with carbon.

Patent document 4 discloses a non-aqueous electrolyte liquid comprising a fluorine-containing phosphate ester having the structure represented below.

[Chem. 1]

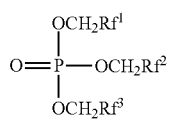

[In the above formula, $Rf^1$, $Rf^2$ and $Rf^3$ may be the same or different, and all of these are fluorine-containing alkyl groups having 1-3 carbon atoms.]

Patent Document 5 discloses a non-aqueous electrolyte liquid comprising a phosphate ester and a bisphosphonate ester and/or a phosphonate ester.

CITATION LIST

Patent Documents

Patent Document 1: JP 06-325765
Patent Document 2: JP 2003-123740
Patent Document 3: JP 2004-47404
Patent Document 4: JP 2008-21560
Patent Document 5: JP 2002-280061

SUMMARY OF THE INVENTION

Problems to be Solved by the Invention

However, if a secondary battery utilizing a silicon oxide disclosed in Patent Document 1 as a negative electrode active substance is charged and discharged at 45° C. or higher, there has been a problem in which capacity deterioration associated with the charge/discharge cycle may become significantly large.

The negative electrode for a secondary battery disclosed in Patent Document 2 has an effect in which the volume change of the negative electrode as a whole is relaxed due to different charge/discharge electric potential of three components when lithium is absorbed and desorbed. However, in Patent document 2, there have been some points which have not been sufficiently studied, regarding a relationship among three kinds of components in a state of coexistence, and regarding the binder, an electrolyte liquid, a conformation of an electrode assembly, and an outer packaging body which are indispensable for fabricating a lithium ion secondary battery.

The negative electrode material for a secondary battery disclosed in Patent document 3 also has an effect in which the volume change of the negative electrode as a whole is relaxed. However, in Patent document 3, there have been some points which have not been sufficiently studied, regarding a binder, an electrolyte liquid, a conformation of an electrode assembly, and an outer packaging body which are indispensable for fabricating a lithium ion secondary battery.

In Patent Documents 4 and 5, there have been some points which have not been sufficiently studied, regarding a negative electrode active substance, a negative electrode binder, a conformation of an electrode assembly and a package which are indispensable for fabricating a lithium ion secondary battery.

Further, in conventional secondary batteries, a phosphate compound is added to an electrolyte liquid in order to impart flame retardancy. However, cycle property may be lowered in the case where the amount of phosphate compound is increased.

Accordingly, an object of the present exemplary embodiment is to provide a high performance secondary battery having good flame retardancy and cycle property.

Means to Solve the Problems

The present exemplary embodiment relates to a secondary battery comprising an electrode assembly in which a positive electrode and a negative electrode are arranged to face each other, an electrolyte liquid and a package accommodating the electrode assembly and the electrolyte liquid, wherein that the negative electrode is formed by binding a negative electrode active substance comprising a metal (a) capable of being alloyed with lithium, a metal oxide (b) capable of occluding and releasing lithium ions and a carbon material (c) capable of occluding and releasing lithium ions, to a negative electrode current collector, with a negative electrode binder, and the electrolyte liquid comprises a supporting salt and an electrolytic solvent, and the electrolytic solvent comprising at least one phosphate ester compound selected from phosphite esters, phosphonate esters and bisphosphonate esters.

Effects of the Invention

By using the electrolyte liquid according to the present exemplary embodiment, a high performance secondary battery having good flame retardancy and cycle property can be provided.

BRIEF DESCRIPTION OF THE DRAWINGS

FIG. 1 is a schematic cross-sectional view showing a structure of an electrode assembly of a layered laminate type secondary battery.

DESCRIPTION OF EMBODIMENTS

Hereinafter, the present exemplary embodiment will be described in detail.

In the secondary battery according to the present exemplary embodiment, an electrode assembly in which a positive electrode and a negative electrode are arranged to face each other and an electrolyte liquid are accommodated in a package. A shape of the secondary battery may be any type selected from among a cylindrical type, a flat wound rectangular type, a stacked rectangular type, a coin type, a flat wound laminate type and a stacked laminate type, but is preferably a stacked laminate type. Hereinafter, a secondary battery of a stacked laminate type will be described.

FIG. 1 is a schematic cross-sectional view showing a structure of an electrode assembly of a secondary battery of a stacked laminate type. The electrode assembly has a planar stacked structure in which a positive electrode and a negative electrode are arranged to face each other, and the electrode assembly shown in FIG. 1 is formed by alternately stacking a plurality of positive electrodes c and a plurality of negative electrodes a with a separator b being interposed therebetween. Respective positive electrode current collectors e which the positive electrodes c have are mutually welded on the end of the each current collector which is not covered with a positive electrode active substance, to be thereby electrically connected, and further a positive electrode terminal f is welded to the welded portion. Respective negative electrode current collectors d which the negative electrodes a have are mutually welded on the end of the each current collector which is not covered with a negative electrode active substance, to be thereby electrically connected, and further a negative electrode terminal g is welded to the welded portion.

Since an electrode assembly having such a planar stacked structure has no portion of a small R (a region near a winding core of a wound structure), an advantage of the electrode assembly is that it is less adversely affected by volume change of the electrode that occurs in the charge/discharge cycle than an electrode assembly having a wound structure. Therefore, the electrode assembly is useful when using an active substance in which a volume expansion is liable to occur.

[1] Negative electrode

A negative electrode is formed by binding a negative electrode active substance on a negative electrode current collector with a negative electrode binder.

The negative electrode active substance in the present exemplary embodiment contains a metal (a) capable of being alloyed with lithium, a metal oxide (b) capable of occluding and releasing lithium ions and a carbon material (c) capable of occluding and releasing lithium ions.

As metal (a), Al, Si, Pb, Sn, In, Bi, Ag, Ba, Ca, Hg, Pd, Pt, Te, Zn, La, or an alloy of two or more thereof can be used. In particular, it is preferable to contain silicon (Si) as metal (a).

As metal oxide (b), silicon oxide, aluminum oxide, tin oxide, indium oxide, zinc oxide, lithium oxide, or a composite thereof can be used. In particular, it is preferable to contain silicon oxide as metal oxide (b). This is because the silicon oxide is relatively stable and hardly causes reactions with other compounds. To metal oxide (b), one or two or more elements selected from nitrogen, boron and sulfur may be further added, for example, from 0.1 to 5% by mass. Thereby, the electroconductivity of metal oxide (b) can be improved.

As carbon material (c), graphite, amorphous carbon, diamond-like carbon, carbon nanotubes, or a composite thereof can be used. Here, graphite having a high crystallinity has a high electroconductivity, and has excellent adhesiveness with a positive electrode current collector including a metal such as copper, and excellent voltage flatness. By contrast, since amorphous carbon having a low crystallinity exhibits relatively small volume expansion, the amorphous carbon has a high advantage of relaxing the volume expansion of the negative electrode as a whole, and hardly causes deterioration caused by nonuniformity including crystal grain boundaries and defects.

The whole or a part of metal oxide (b) preferably has an amorphous structure. Metal oxide (b) of an amorphous structure can suppress volume expansion of carbon material (c) and metal (a), and can also suppress decomposition of an electrolyte liquid such as one containing a phosphate compound. This mechanism is not clear, but it is presumed that metal oxide (b) having an amorphous structure has some influence on the film formation at the interface between carbon material (c) and the electrolyte liquid. The amorphous structure is believed to have a relatively small constituent due to nonuniformity such as crystal grain boundary or a defect. The whole or a part of metal oxide (b) having an amorphous structure can be confirmed by X-ray diffractometry (common XRD measurement). Specifically, in the case where metal oxide (b) has no amorphous structure, a peak intrinsic to metal oxide (b) is observed, but in the case where the whole or a part of metal oxide (b) has an amorphous structure, a peak intrinsic to metal oxide (b) is observed as a broad peak.

Metal oxide (b) is preferably an oxide of a metal constituting metal (a). Metal (a) and metal oxide (b) are also preferably silicon (Si) and silicon oxide (SiO), respectively. Hereinafter, a negative electrode active substance in which silicon and silicon oxide each are used as metal (a) and metal oxide (b), respectively, are also abbreviated as Si/SiO/C active substance.

The whole or a part of metal (a) is preferably dispersed in metal oxide (b). Dispersing at least a part of metal (a) in metal oxide (b) can further suppress the volume expansion of a negative electrode as a whole, and can also suppress the decomposition of an electrolyte liquid. The whole or a part of metal (a) being dispersed in metal oxide (b) can be confirmed by the combined use of the transmission electron microscopic observation (common TEM observation) and the energy dispersive X-ray spectroscopy (common EDX measurement). Specifically, it can be confirmed that the metal constituting the metal particle (a) has not been turned to an oxide of the metal, by observing the cross-section of a sample containing the metal particle (a) and measuring the oxygen concentration of the metal particle (a) dispersed in metal oxide (b).

A negative electrode active substance wherein the whole or a part of metal oxide (b) has an amorphous structure, and the whole or a part of metal (a) is dispersed in the metal oxide (b) can be fabricated, for example, by the method as disclosed in Patent Literature 3. That is, subjecting metal oxide (b) to a CVD process under an atmosphere containing an organic gas such as methane gas can give a composite in which metal (a) in the metal oxide (b) is made into nano-clusters and is covered on the surface with carbon material (c). Alternatively, the negative electrode active substance can be fabricated by mixing carbon material (c), metal (a) and metal oxide (b) by mechanical milling.

As described above, the content of metal (a), the content of metal oxide (b) and the content of carbon material (c) with respect to the total of metal (a), metal oxide (b) and carbon oxide (c) are preferably 5% by mass or more and 90% by mass or less, 5% by mass or more and 90% by mass or less, and 2% by mass or more and 80% by mass or less, respectively. Also, the content of metal (a), the content of metal oxide (b) and the content of carbon material (c) with respect to the total of metal (a), metal oxide (b) and carbon material (c) are more preferably 20% by mass or more and 50% by mass or less, 40% by mass or more and 70% by mass or less, and 2% by mass or more and 30% by mass or less, respectively.

Metal (a), metal oxide (b) and carbon material (c) that is used can be, but should not be particularly limited, a particle thereof. For example, the average particle diameter of metal (a) can be constituted to be smaller than the average particle diameters of carbon material (c) and metal oxide (b). With such a constitution, since the particle diameter of metal (a) in which little volume change occurs during the charge/discharge cycle is relatively small and the particle diameters of carbon material (c) and metal oxide (b) in which large volume change occurs are relatively large, the formation of dendrite and the micro-powdering of the alloy can be more effectively suppressed. Lithium is consequently occluded in and released from the large-sized particle, the small-sized particle and the large-sized particle in this order in the charge/discharge process, and also from this point, the generation of the residual stress and the residual strain is suppressed. The average particle diameter of metal (a) can be made to be, for example, 20 μm or smaller, and is preferably made to be 15 μm or smaller.

The average particle diameter of metal oxide (b) is preferably ½ or smaller than that of carbon material (c), and the average particle diameter of metal (a) is preferably ½ or smaller than that of metal oxide (b). It is more preferable that the average particle diameter of metal oxide (b) be ½ or smaller than that of carbon material (c), and the average particle diameter of metal (a) be ½ or smaller than that of metal oxide (b). Controlling the average particle diameters in such ranges can more effectively provide the effect of relaxing the volume expansion of the metal and the alloy phase, and can provide a secondary battery that has excellent balance between energy density, the cycle life and efficiency. More specifically, it is preferable that the average particle diameter of silicon oxide (b) be made to be ½ or smaller than that of graphite (c), and the average particle diameter of silicon (a) be made to be ½ or smaller than that of silicon oxide (b). Still more specifically, the average particle diameter of silicon (a) can be made to be, for example, 20 μm or smaller, and is preferably made to be 15 μm or smaller.

The negative electrode binder should not be particularly limited, but, for example, polyfluorovinylidene (PVdF), vinylidene fluoride-hexafluoropropylene copolymer, vinylidene fluoride-tetrafluoroethylene copolymer, styrene-butadiene copolymer rubber, polytetrafluoroethylene, polypropylene, polyethylene, polyimide (PI), polyamideimide (PAI) and the like can be used. Among these, polyimide (PI) and polyamideimide (PAI) are preferred. By using polyimide or polyamideimide as the negative electrode binder, adhesion between a negative electrode active substance and a current collector is improved. Therefore, since an electrical contact between the negative electrode active substance and the collector is better maintained during the repeated charge/discharge, it is possible to obtain good cycle property.

A content of the negative electrode binder is preferably 1-30% by mass, more preferably 2-25% by mass with respect to the total amount of the negative electrode active substance and the negative electrode binder. In the case where the content is 1% by mass or more, adhesion between the active substances or between the active substance and the current collector is improved, thereby can obtain better cycle property. In the case where the content is 30% by mass or less, the ratio of the active substance is increased and hence the capacity of negative electrode can be increased.

The negative electrode current collector is not particularly limited, but is preferably aluminum, nickel, copper, silver, or an alloy thereof in the viewpoint of electrochemical stability. The shape thereof includes a foil, a plate-shape and a mesh shape.

The negative electrode can be fabricated by forming a negative electrode active substance layer containing a negative electrode active substance and a negative electrode binder, on the negative electrode current collector. A formation method of the negative electrode active substance layer includes a doctor blade method, a die coater method, a CVD method, and a sputtering method. A negative electrode current collector may be made by forming a negative electrode active substance layer in advance, and thereafter forming a thin film of aluminum, nickel or an alloy thereof by a method such as vapor deposition or sputtering.

[2] Positive electrode

A positive electrode is formed, for example by binding a positive electrode active substance on a positive electrode current collector with a positive electrode binder so that the positive electrode active substance covers the positive electrode collector.

The positive electrode active substance includes lithium manganate having a lamellar structure or lithium manganate having a spinel structure such as $LiMnO_2$ and $Li_xMn_2O_4$ ($0<x<2$); $LiCoO_2$, $LiNiO_2$ and materials in which a part of the transition metal thereof are substituted with another metal; lithium transition metal oxides such as $LiNi_{1/3}Co_{1/3}Mn_{1/3}O_2$, in which the molar ratio of a specific transition metal is not more than one half; and materials which have lithium at a larger amount than the stoichiometric amount in these lithium transition metal oxides. Particularly, $Li_\alpha Ni_\beta Co_\gamma Al_\delta O_2$ ($1 \leq \alpha \leq 1.2$, $\beta+\gamma+\delta=1$, $\beta \geq 0.7$, $\gamma \leq 0.2$) or $Li_\alpha Ni_\beta Co_\gamma Mn_\delta O_2$ ($1 \leq \alpha \leq 1.2$, $\beta+\gamma+\gamma=1$, $\beta \geq 0.6$, $\gamma \leq 0.2$) is preferable. The positive electrode active substance can be used singly or in combinations of two or more.

As a positive electrode binder, the same one as the negative electrode binder can be used. Above all, polyvinylidene fluoride is preferable from the viewpoint of versatility and low cost. A content of the positive electrode binder is preferably 1-20% by mass, more preferably 2-10% by mass with respect to the total amount of the positive electrode active substance and the positive electrode binder in the viewpoint of "sufficient binding force" and "increased energy", which are in a tradeoff relationship.

As the positive electrode current collector, the same one as the negative electrode current collector can be used.

An electroconductive auxiliary material may be added to a positive electrode active substance layer containing a positive electrode active substance in order to reduce impedance. The electroconductive auxiliary material includes carbonaceous microparticles of graphite, carbon black, acetylene black and the like.

[3] Electrolyte liquid

An electrolyte liquid used in the present exemplary embodiment comprises a supporting salt and an electrolytic solvent. The electrolytic solvent comprises at least one phosphate ester compound selected from phosphite esters, phosphonate esters and bisphosphonate esters.

In the present exemplary embodiment, by using the electrolytic solvent comprising the phosphate ester compound and the negative electrode active substance, a secondary battery having good flame retardancy and cycle property can be provided.

The phosphite esters, phosphonate esters and bisphosphonate esters are preferably represented by the following general formulas (1) to (3), respectively.

[Chem. 2]

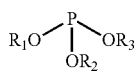

(1)

[$R_1$ to $R_3$ denote each independently a substituted or unsubstituted alkyl group, a substituted or unsubstituted aryl group, or a substituted or unsubstituted silyl group.]

[Chem. 3]

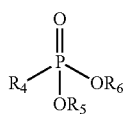

(2)

[$R_4$ denotes hydrogen atom or a substituted or unsubstituted alkyl group, $R_5$ and $R_6$ denote each independently a substituted or unsubstituted alkyl group, a substituted or unsubstituted aryl group, or a substituted or unsubstituted silyl group.]

[Chem. 4]

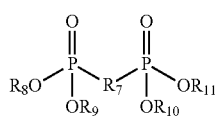

(3)

[$R_7$ denotes an alkylene group, $R_8$ to $R_{11}$ denote each independently a substituted or unsubstituted alkyl group, a substituted or unsubstituted aryl group, or a substituted or unsubstituted silyl group.]

In $R_1$ to $R_3$ in the above general formula (1), the alkyl group is preferably an alkyl group having 1-12 carbon atoms in total, more preferably an alkyl group having 1-6 carbon atoms in total, and even more preferably an alkyl group having 1-4 carbon atoms in total. The alkyl group include straight-chain alkyl groups, branched-chain alkyl groups or cyclic alkyl groups, and straight-chain alkyl groups or branched-chain alkyl groups are preferred. The aryl group is preferably an aryl group having 6-18 carbon atoms in total, more preferably an aryl group having 6-12 carbon atoms in total, and even more preferably an aryl group having 6-10 carbon atoms in total. Moreover, the substituted or unsubstituted silyl group is represented by —$SiR_xR_yR_z$ where $R_x$, $R_y$ and $R_z$ are each independently hydrogen atom, a halogen atom, or an alkyl group having 1-6 carbon atoms which may be branched. The silyl group may include, for example, trimethylsilyl group, triethylsilyl group, or the like.

In $R_4$ in the above general formula (2), the alkyl group is preferably an alkyl group having 1-8 carbon atoms in total, more preferably an alkyl group having 1-6 carbon atoms in total, and even more preferably an alkyl group having 1-4 carbon atoms in total. The alkyl group is preferably a straight-chain alkyl groups or branched-chain alkyl groups.

In $R_5$ and $R_6$ in the above general formula (2), the alkyl group is preferably an alkyl group having 1-12 carbon atoms in total, more preferably an alkyl group having 1-6 carbon atoms in total, and even more preferably an alkyl group having 1-4 carbon atoms in total. The alkyl group include straight-chain alkyl groups, branched-chain alkyl groups or cyclic alkyl groups, and straight-chain alkyl groups or branched-chain alkyl groups are preferred. The aryl group is preferably an aryl group having 6-18 carbon atoms in total, more preferably an aryl group having 6-12 carbon atoms in total, and even more preferably an aryl group having 6-10 carbon atoms in total. Moreover, the substituted or unsubstituted silyl group is represented by —$SiR_xR_yR_z$ where $R_x$, $R_y$ and $R_z$ are each independently hydrogen atom, a halogen atom, or an alkyl group having 1-6 carbon atoms which may be branched. The silyl group may include, for example, trimethylsilyl group, triethylsilyl group, or the like.

In $R_7$ in the above general formula (3), the alkylene group is preferably an alkylene group having 1-6 carbon atoms in total, more preferably an alkylene group having 1-4 carbon atoms in total, and even more preferably an alkylene group having 1-2 carbon atoms in total.

In $R_8$ to $R_{11}$ in the above general formula (3), the alkyl group is preferably an alkyl group having 1-12 carbon atoms in total, more preferably an alkyl group having 1-6 carbon atoms in total, and even more preferably an alkyl group having 1-4 carbon atoms in total. The alkyl group include straight-chain alkyl groups, branched-chain alkyl groups or cyclic alkyl groups, and straight-chain alkyl groups or branched-chain alkyl groups are preferred. The aryl group is preferably an aryl group having 6-18 carbon atoms in total, more preferably an aryl group having 6-12 carbon atoms in total, and even more preferably an aryl group having 6-10 carbon atoms in total. Moreover, the substituted or unsubstituted silyl group is represented by —$SiR_xR_yR_z$ where $R_x$, $R_y$ and $R_z$ are each independently hydrogen atom, a halogen atom, or an alkyl group having 1-6 carbon atoms which may be branched. The silyl group may include, for example, trimethylsilyl group, triethylsilyl group, or the like.

More particularly, substituents for alkyl and aryl groups include, for example, alkyl groups having 1-6 carbon atoms (such as methyl group, ethyl group, propyl group, iso-propyl group and butyl group), hydroxyl group, cycloalkyl groups having 3-6 carbon atoms (such as cyclopropyl group, cyclobutyl group, cyclopentyl group and cyclohexyl group), alkoxy groups having 1-6 carbon atoms (such as methoxy group, ethoxy group, n-propoxy group, iso-propoxy group, n-butoxy group and tert-butoxy group), aryl groups having 6-10 carbon atoms (such as phenyl group and naphthyl group), amino groups having 0-6 carbon atoms (including dimethylamino group and diethylamino group), or halogen atoms (such as chlorine atom, bromine atom and fluorine atom); and the like.

A content of the phosphate ester compound in the electrolytic solvent should not be particularly limited, but is preferably 10% by mass or more, more preferably 15% by mass or more, and even more preferably 20% by mass in the viewpoint of imparting flame retardancy.

The electrolytic solvent preferably comprises a fluorinated carbonate in addition to the phosphate ester compound. By adding a fluorinated carbonate to an electrolyte liquid, cycle property can be more improved. The fluorinated carbonate includes a linear-type and cyclic-type fluorinated carbonate, and cyclic-type fluorinated carbonate (hereinafter, it is also referred to as fluorinated cyclic-type carbonates) is preferred.

For example, a content of the fluorinated carbonate is preferably in the range of 0.1-10% by mass, more preferably in the range of 0.2-8% by mass, and even more preferably in the range of 1-5% by mass.

As the fluorinated cyclic-type carbonate, it is not particularly limited to, compounds such as propylene carbonate, vinylene carbonate and vinylethylene carbonate which are partially fluorinated may be used. More particularly, for example, 4-fluoro-1,3-dioxolane-2-on (fluoroethylene carbonate, hereinafter, it is also abbreviated as FEC), (cis or trans) 4,5-difluoro-1,3-dioxolane-2-on, 4,4-difluoro-1,3-dioxolane-2-on, 4-fluoro-5-methyl-1,3-dioxolane-2-on and the like may be used. Among these, a fluoroethylene carbonate is preferred.

As the linear-type fluorinated carbonate, it is not particularly limited to, compounds such as dimethyl carbonate, diethyl carbonate, ethylmethyl carbonate, dipropyl carbonate and methyl-propyl carbonate whose hydrogen atoms are partially or entirely substituted with fluorine atom may be used. More particularly, for example, bis(fluoroethyl)carbonate, 3-fluoropropylmethyl carbonate, 3,3,3-trifluoropropylmethyl carbonate, and the like may be used.

The improvement of cycle property by the addition of the fluorinated carbonate is significantly exerted when the content of the phosphate ester compound is large. Thus, by adding the phosphate ester compound at high concentration and also adding the fluorinated carbonate, in the present exemplary embodiment, a secondary battery having high flame retardancy and good cycle property can be provided. In this context, in the case where the electrolytic solvent comprises the fluorinated carbonate, a content of the phosphate ester compound is preferably 20% by mass or more, and more preferably 40% by mass or more. In addition, the fluorinated carbonate is more preferably a fluorinated cyclic-type carbonate.

The electrolytic solvent may further comprise other non-aqueous solvent. The non-aqueous solvent includes aprotic organic solvents including, for example, cyclic carbonate compounds such as propylene carbonate (PC), ethylene carbonate (EC), butylene carbonate (BC), vinylene carbonate (VC), vinylethylene carbonate (VEC) and the like; linear-type carbonate compounds such as dimethylcarbonate (DMC), diethylcarbonate (DEC), ethylemethylcarbonate (EMC), dipropylcarbonate (DPC) and the like; carbonate compounds such as derivatives of propylene carbonate; aliphatic carboxylic acid esters such as methyl formate, methyl acetate, ethyl propionate and the like; and the like. Also, compounds such as propanesulfone (PS) or butanesulfone (BS) may be added. In addition, ethers such as diethylether or dimethylether or fluorinated ethers in which some of hydrogen atoms in the ethers are fluorinated may be used. These non-aqueous solvents may be added alone or in a combination of two or more species.

In the present exemplary embodiment, it is preferred that the electrolytic solvent further comprises carbonates (it is also called 'non-fluorinated carbonates') other than fluorinated carbonates. By using a non-fluorinated carbonate, the ion dissociation of electrolyte liquid is enhanced, and also the viscosity of electrolyte liquid is decreased. As a result, the mobility of ions may be increased. The non-fluorinated carbonate includes linear-type or cyclic-type carbonates (non-fluorinated) as described above.

Thus, the electrolytic solvent preferably comprises a phosphate ester compound, a fluorinated carbonate and a non-fluorinated carbonate, and the content of the phosphate ester compound is 40% by mass or more, the content of the fluorinated carbonate is 0.1-10% by mass, and the remaining is the non-fluorinated carbonate. In this case, the fluorinated carbonate is more preferably a fluorinated cyclic-type carbonate.

Also, the electrolytic solvent may comprise a phosphate ester. The phosphate ester includes, for example, trimethyl phosphate, triethyl phosphate, tripropyl phosphate, trioctyl phosphate, triphenyl phosphate and the like. For example, a content of the phosphate ester in the electrolytic solvent is preferably 30% by mass or more, and more preferably 40% by mass ore more.

Thus, the electrolytic solvent comprises preferably a phosphate ester compound, a fluorinated carbonate and a phosphate ester, and the content of the phosphate ester compound is 40% by mass or more, the content of the fluorinated carbonate is 0.1-10% by mass, and the remaining is the phosphate ester. In this case, the fluorinated carbonate is more preferably a fluorinated cyclic-type carbonate.

In addition, the electrolyte liquid comprises a supporting salt. The supporting salt should not be particularly limited, but is preferably a lithium salt. The lithium salt include, for example, $LiPF_6$, $LiAsF_6$, $LiAlCl_4$, $LiClO_4$, $LiBF_4$, $LiSbF_6$, $LiCF_3SO_3$, $LiC_4F_9SO_3$, $LiN(CF_3SO_2)(C_2F_5SO_2)$, $LiN(CF_3SO_2)_2$, $LiN(C_2F_5SO_2)_2$ and the like, and $LiPF_6$ is preferred. The supporting salts may be used alone or in a combination of two or more species.

In the present exemplary embodiment, a concentration of the lithium salt in the electrolyte liquid may be 0.8M or more and 3M or less, for example.

Preferably, the concentration of lithium salt is increased along with increasing of the content of phosphate ester compound. Particularly, in the case where the content of a phosphate ester compound in the electrolytic solvent is less than 20%, the concentration of lithium salt in the electrolyte liquid is preferably in the range of 0.8 to 1.2 M. In the case where the content of a phosphate ester compound in the electrolytic solvent is 20% or more and less than 40%, the concentration of lithium salt is preferably in the range of 1.0 to 1.6 M. Also, in the case where the content of a phosphate ester compound in the electrolytic solvent is 40% or more, the concentration of lithium salt in the electrolyte liquid is preferably in the range of 1.0 to 1.8 M.

When adding additionally a fluorinated carbonate such as FEC, the concentration of lithium salt in the electrolyte liquid is preferably in the range of 0.8 to 1.5 M, and more preferably in the range of 1.0 to 1.2 M, regardless of the content of a phosphate ester compound in the electrolytic solvent.

[4] Separator

As a separator, porous films or non-woven fabrics of polypropylene, polyethylene or the like can be used. As the separator, laminated ones thereof can also be used.

[5] Package

A package is arbitrarily selected as long as it is stable against an electrolyte liquid, and has a sufficient water vapor barrier property. For example, in the case of a secondary battery of a stacked laminate type, as the package, a laminate film of polypropylene, polyethylene or the like coated with aluminum or silica can be used. Particularly, an aluminum laminate film is preferably used from the viewpoint of suppressing volume expansion.

EXAMPLES

Hereinafter, the present exemplary embodiment will be described specifically by way of Examples.

Example 1

A silicon of 5 μm in average particle diameter as metal (a), an amorphous silicon oxide ($SiO_x$, $0<x\leq2$) of 13 μm in average particle diameter as metal oxide (b) and graphite of 30 μm in average particle diameter as carbon material (c) were weighed in the mass ratio of 30:62:8. Then, these materials were mixed for 24 hours by so-called mechanical milling to thereby obtain a negative electrode active substance. In the negative electrode active substance, the silicon that is metal (a) was dispersed in the silicon oxide ($SiO_x$, $0<x\leq2$) that is metal oxide (b).

The negative electrode active substance (average particle diameter: $D_{50}$=5 μm) and a polyimide (made by UBE Industries, Ltd., trade name: U Varnish A) as a negative electrode binder were weighed in a mass ratio of 85:15, and mixed with n-methylpyrrolidone to thereby prepare a negative electrode slurry. The negative electrode slurry was applied to a copper foil having a thickness of 10 μm, thereafter dried, and further subjected to thermal treatment at 300° C. under a nitrogen atmosphere to thereby fabricate a negative electrode. In Table 1, the content (%) of a negative electrode binder indicates the content (% by mass) of the negative electrode binder with respect to the negative electrode active substance and the negative electrode binder.

Lithium nickelate ($LiNi_{0.80}Co_{0.15}Al_{0.15}O_2$) as a positive electrode active substance, carbon black as an electroconductive auxiliary material, and polyvinylidene fluoride as a positive electrode binder were weighed in a mass ratio of 90:5:5. Then, these materials were mixed with n-methylpyrrolidone to thereby prepare a positive electrode slurry. The positive electrode slurry was applied to an aluminum foil having a thickness of 20 μm, thereafter dried, and further pressed to thereby fabricate a positive electrode.

Three layers of the obtained positive electrode and four layers of the obtained negative electrode were alternately stacked with a polypropylene porous film as a separator being interposed therebetween. Ends of the positive electrode current collectors which were not covered with the positive electrode active substance, and ends of the negative electrode current collectors which were not covered with the negative electrode active substance were each welded. Further to the respective welded portions, a positive electrode terminal made of aluminum and a negative electrode terminal made of nickel were respectively welded to thereby obtain an electrode assembly having a planar stacked structure.

On the other hand, triethyl phosphite as a phosphate ester compound and a non-fluorinated carbonate were mixed in a proportion of 20 parts by mass and 80 parts by mass, respectively, to thereby prepare an electrolytic solvent. Then, as a supporting salt, $LiPF_6$ was dissolved in the electrolytic solvent at the concentration of 1 M (mol/l), to thereby prepare an electrolyte liquid. As the non-fluorinate carbonate, a mixed solvent of EC/DEC=30/70 (volume ratio) was used. In Table 1, the content (%) represents the content (% by mass) in the electrolytic solvent.

The electrode assembly was packed with an aluminum laminate film as a package and the electrolyte liquid was injected in the interior, and sealed while the pressure was reduced to 0.1 atm, to thereby fabricate a secondary battery.

<Evaluation>

(20° C. Cycle)

A test of repeating charge/discharge in the voltage range from 2.5 V to 4.2 V in a constant-temperature bath held at 20° C. was carried out on the fabricated secondary battery to thereby evaluate the maintenance rate (%). The results are shown in Table 3. In Table 3, "maintenance rate (%)" represents (discharge capacity at 10th cycle)/(discharge capacity at the 2nd cycle)×100 (% unit).

(Flame retardancy test)

A filter paper of glass fiber having width of 3 mm, length of 30 mm and thickness of 0.7 mm was wetted with 50 μL of the electrolyte liquid. An end of the filter paper was picked with tweezers and the other end was get close to gas burner flame of 2 cm height. After 2 seconds, the filter paper was located away from the flame, and the presence of flame in the paper was visually confirmed. Case when flame was observed or flame was gone out within 3 seconds after the flame was observed was determined as 'non-flammable'. Case when the flame was not gone out after 3 seconds was determined as 'flammable'. The results are shown in Table 3.

Example 2

A secondary battery was fabricated and evaluated in the same manner as Example 1, except that the concentration of the supporting salt was selected as shown in Table 1. The result is shown in Table 3.

Example 3

A secondary battery was fabricated and evaluated in the same manner as Example 1, except that the content of the phosphate ester compound and the content of the non-fluorinated compound were selected as shown in Table 1. The result is shown in Table 3.

Example 4

A secondary battery was fabricated and evaluated in the same manner as Example 3, except that the concentration of the supporting salt was selected as shown in Table 1. The result is shown in Table 3.

Example 5 and 6

Secondary batteries were fabricated and evaluated in the same manner as Example 1, except that the contents of the phosphate ester compounds and the contents of the non-fluorinated compounds were selected as shown in Table 1 and except that FEC was added at the content of 2% by mass in the electrolytic solvent. The results are shown in Table 3.

Example 7

A secondary battery was fabricated and evaluated in the same manner as Example 1, except that the content of the phosphate ester compound was selected as shown in Table 1, and except that non-fluorinated compound was not used, and except that FEC was added at the content of 2% by mass in the electrolytic solvent. The result is shown in Table 3.

Example 8

A secondary battery was fabricated and evaluated in the same manner as Example 4, except that the kind of the phosphate ester compound was selected as shown in Table 1. The result is shown in Table 3.

Example 9 to 14

Secondary batteries were fabricated and evaluated in the same manner as Example 5, except that the kinds of the phosphate ester compounds were selected as shown in Table 1. The results are shown in Table 3.

Example 15

According to the method described in Patent Document 3, a negative electrode active substance was obtained which contained a silicon, an amorphous silicon oxide ($SiO_x$, $0<x\leq2$) and a carbon in a mass ratio of 30:62:8. In the negative electrode active substance, the silicon as metal (a) was dispersed in the amorphous silicon oxide as metal oxide (b). Then, the present Example was carried out in the same manner as Example 1, except that the negative electrode active substance was used. The result is shown in Table 3.

Example 16

A secondary battery was fabricated and evaluated in the same manner as Example 5, except that the negative electrode active substance described in Example 15 was used. The result is shown in Table 3.

Example 17

A secondary battery was fabricated and evaluated in the same manner as Example 15, except that the electrolytic solvent which is prepared by mixing diethyl ethylphosphonate, triethyl phosphate (TEP) and FEC at the proportion as shown in Table 2 was used. The result is shown in Table 3.

Example 18

A secondary battery was fabricated and evaluated in the same manner as Example 15, except that the electrolytic solvent which is prepared by mixing tetraethyl methylenediphosphonate, triethyl phosphate (TEP) and FEC at the proportion as shown in Table 2 was used. The result is shown in Table 3.

Example 19

A secondary battery was fabricated and evaluated in the same manner as Example 15, except that the electrolytic solvent which is prepared by mixing tetrapropyl methylenediphosphonate, triethyl phosphate (TEP) and FEC at the proportion as shown in Table 2 was used. The result is shown in Table 3.

Example 20

A secondary battery was fabricated and evaluated in the same manner as Example 15, except that the electrolytic solvent which is prepared by mixing diethyl methoxymethylphosphonate, triethyl phosphate (TEP) and FEC at the proportion as shown in Table 2 was used. The result is shown in Table 3.

Comparative Example 1

A secondary battery was fabricated and evaluated in the same manner as Example 1, except that graphite was used as the negative electrode active substance and except that an electrolytic solvent containing only non-fluorinated carbonate was used. The result is shown in Table 3.

Comparative Example 2

A secondary battery was fabricated and evaluated in the same manner as Example 1, except that graphite was used as the negative electrode active substance. The result is shown in Table 3.

Comparative Example 3

A secondary battery was fabricated and evaluated in the same manner as Example 3, except that graphite was used as the negative electrode active substance. The result is shown in Table 3.

Comparative Example 4

A secondary battery was fabricated and evaluated in the same manner as Example 5, except that graphite was used as the negative electrode active substance. The result is shown in Table 3.

Comparative Example 5

A secondary battery was fabricated and evaluated in the same manner as Example 7, except that graphite was used as the negative electrode active substance. The result is shown in Table 3.

Comparative Example 6

A secondary battery was fabricated and evaluated in the same manner as Example 12, except that graphite was used as the negative electrode active substance. The result is shown in Table 3.

TABLE 1

| | Negative electrode | | | Electrolyte | | | | | | |
|---|---|---|---|---|---|---|---|---|---|---|
| | Active substance | Binder | | Supporting salt | | Electrolytic solvent | | | | |
| | | | | | | Phosphate ester compound | | Carbonate compound | | Fluorinated cyclic-type carbonate |
| | Si/SiO/C Ratio | Kind | Content (%) | Kind | Con. (M) | Kind | Content (%) | Kind | Content (%) | Kind | Content (%) |
| Example 1 | 30/62/8 | PI | 15 | LiPF6 | 1 | Triethyl phosphite | 20 | EC:DEC | 80 | — | — |
| Example 2 | 30/62/8 | PI | 15 | LiPF6 | 1.5 | Triethyl phosphite | 20 | EC:DEC | 80 | — | — |

TABLE 1-continued

|  | Negative electrode | | | Electrolyte | | | | | | | |
|---|---|---|---|---|---|---|---|---|---|---|---|
|  | | | | Supporting salt | | Electrolytic solvent | | | | | |
|  | Active substance | Binder | | | | Phosphate ester compound | | Carbonate compound | | Fluorinated cyclic-type carbonate | |
|  | Si/SiO/C Ratio | Kind | Content (%) | Kind | Con. (M) | Kind | Content (%) | Kind | Content (%) | Kind | Content (%) |
| Example 3 | 30/62/8 | PI | 15 | LiPF6 | 1 | Triethyl phosphite | 40 | EC:DEC | 60 | — | — |
| Example 4 | 30/62/8 | PI | 15 | LiPF6 | 1.8 | Triethyl phosphite | 40 | EC:DEC | 60 | — | — |
| Example 5 | 30/62/8 | PI | 15 | LiPF6 | 1 | Triethyl phosphite | 40 | EC:DEC | 58 | FEC | 2 |
| Example 6 | 30/62/8 | PI | 15 | LiPF6 | 1 | Triethyl phosphite | 80 | EC:DEC | 18 | FEC | 2 |
| Example 7 | 30/62/8 | PI | 15 | LiPF6 | 1 | Triethyl phosphite | 98 | — | — | FEC | 2 |
| Example 8 | 30/62/8 | PI | 15 | LiPF6 | 1.8 | Trimethyl phosphite | 40 | EC:DEC | 60 | — | — |
| Example 9 | 30/62/8 | PI | 15 | LiPF6 | 1 | Trimethyl phosphite | 40 | EC:DEC | 58 | FEC | 2 |
| Example 10 | 30/62/8 | PI | 15 | LiPF6 | 1 | Triphenyl phosphite | 40 | EC:DEC | 58 | FEC | 2 |
| Example 11 | 30/62/8 | PI | 15 | LiPF6 | 1 | Tris (trimethylsilyl) phosphite | 40 | EC:DEC | 58 | FEC | 2 |
| Example 12 | 30/62/8 | PI | 15 | LiPF6 | 1 | Ethylphosphonate diethyl | 40 | EC:DEC | 58 | FEC | 2 |
| Example 13 | 30/62/8 | PI | 15 | LiPF6 | 1 | Methylphosphonate dimethyl | 40 | EC:DEC | 58 | FEC | 2 |
| Example 14 | 30/62/8 | PI | 15 | LiPF6 | 1 | Methylenediphophonate tetraethyl | 40 | EC:DEC | 58 | FEC | 2 |
| Comp. Example 1 | 0/0/100 | PI | 15 | LiPF6 | 1 | — | — | EC:DEC | 100 | — | — |
| Comp. Example 2 | 0/0/100 | PI | 15 | LiPF6 | 1 | Triethyl phosphite | 20 | EC:DEC | 80 | — | — |
| Comp. Example 3 | 0/0/100 | PI | 15 | LiPF6 | 1 | Triethyl phosphite | 40 | EC:DEC | 60 | — | — |
| Comp. Example 4 | 0/0/100 | PI | 15 | LiPF6 | 1 | Triethyl phosphite | 40 | EC:DEC | 58 | FEC | 2 |
| Comp. Example 5 | 0/0/100 | PI | 15 | LiPF6 | 1 | Triethyl phosphite | 98 | — | — | FEC | 2 |
| Comp. Example 6 | 0/0/100 | PI | 15 | LiPF6 | 1 | Ethylphosphonate diethyl | 40 | EC:DEC | 58 | FEC | 2 |

TABLE 2

|  | Negative electrode | | | Electrolyte | | | | | | | |
|---|---|---|---|---|---|---|---|---|---|---|---|
|  | | | | Supporting salt | | Electrolytic solvents | | | | | |
|  | Active substance | Binder | | | | Phosphate ester compound | | Phosphate ester | | Fluorinated cyclic-type carbonate | |
|  | Si/SiO/C Ratio | Kind | Content (%) | Kind | Con. (M) | Kind | Content (%) | Kind | Content (%) | Kind | Content (%) |
| Example 17 | 30/62/8 | PI | 15 | LiPF6 | 1 | Ethylphosphonate diethyl | 40 | TEP | 58 | FEC | 2 |
| Example 18 | 30/62/8 | PI | 15 | LiPF6 | 1 | Methylenediphophonate tetraethyl | 40 | TEP | 58 | FEC | 2 |
| Example 19 | 30/62/8 | PI | 15 | LiPF6 | 1 | Methylenediphophonate tetrapropyl | 40 | TEP | 58 | FEC | 2 |
| Example 20 | 30/62/8 | PI | 15 | LiPF6 | 1 | Methoxymethyl phosphonate diethyl | 40 | TEP | 58 | FEC | 2 |

TABLE 3

|  | Cycle property (20° C.) Maintenance rate (%) | Burning test |
|---|---|---|
| Example 1 | 71 | Non-flammable |
| Example 2 | 85 | Non-flammable |
| Example 3 | 68 | Non-flammable |
| Example 4 | 83 | Non-flammable |
| Example 5 | 93 | Non-flammable |
| Example 6 | 95 | Non-flammable |
| Example 7 | 96 | Non-flammable |
| Example 8 | 75 | Non-flammable |
| Example 9 | 90 | Non-flammable |
| Example 10 | 89 | Non-flammable |
| Example 11 | 87 | Non-flammable |
| Example 12 | 93 | Non-flammable |
| Example 13 | 86 | Non-flammable |
| Example 14 | 91 | Non-flammable |
| Example 15 | 73 | Non-flammable |
| Example 16 | 95 | Non-flammable |
| Example 17 | 90 | Non-flammable |
| Example 18 | 86 | Non-flammable |
| Example 19 | 76 | Non-flammable |
| Example 20 | 84 | Non-flammable |
| Comp. Example 1 | 99 | Flammable |
| Comp. Example 2 | 51 | Non-flammable |
| Comp. Example 3 | 0 | Non-flammable |
| Comp. Example 4 | 25 | Non-flammable |
| Comp. Example 5 | 13 | Non-flammable |
| Comp. Example 6 | 10 | Non-flammable |

As shown in Tables 1 and 2, when graphite was used as a negative electrode active substance, the cycle property was remarkably lowered as the content of triethyl phosphite is increased (Comparative examples 1-3). To the contrary, when Si/SiO/C active substance was used as a negative electrode active substance, the extent of deterioration of cycle property, i.e. the extent of reduced maintenance rate was smaller than the case of using graphite active substance (Example 1 and 3). Also, it was demonstrated that the decrease of cycle maintenance rate could be prevented by increasing the concentration of lithium salt in the electrolyte liquid, even if the content of the phosphite ester was increased (Example 2 and 4). Thus, by using Si/SiO/C negative electrode active substance and non-aqueous electrolyte liquid comprising a phosphate ester compound, a secondary battery having good flame retardancy and cycle property can be obtained.

Further, when Si/SiO/C active substance and an electrolyte liquid comprising a phosphate ester compound were used, the cycle property was more enhanced by adding fluoro-ethylene carbonate to the non-aqueous electrolyte liquid even if the concentration of lithium salt was not increased (Example 5-7). This trend was not effectively shown in the case where graphite was used as a negative electrode active substance (Comparative examples 4 and 5), while this trend was significantly shown in the case where Si/SiO/C active substance was used, and particularly more significantly shown in the case where the content of the phosphate ester compound become to be large. This reason is assumed that since graphite and Si/SiO/C active substance have different reaction potentials inside the battery, the composition or thickness of a film formed on the surface of battery is different, then a fluorinated cyclic-type carbonate in Si/SiO/C active substance may give a preferable effect to battery properties. In particular, a reason why the cycle property was enhanced in the case where the content of a phosphate ester compound is increased is contemplated and described below. In the case of an electrolyte liquid comprising a large amount of non-fluorinated carbonate, it is considered that the non-fluorinated carbonate is preferentially decomposed than a fluorinated carbonate during charge/discharge to form a film. Also, in the case of an electrolyte liquid comprising a large amount of a phosphate ester compound, it is considered that a fluorinated carbonate is preferentially decomposed than the phosphate ester compound during charge/discharge to form a film derived from the fluorinated carbonate on a negative electrode. Consequently, it is expected that the interaction between the film derived from the fluorinated carbonate, and the phosphate ester compound may enhances cycle property. Therefore, by adding a phosphate ester compound at high concentration and also adding a fluorinated carbonate, a secondary battery having good flame retardancy and good cycle property can be provided.

In addition, it was shown that cycle properties were improved as the concentration of supporting salts was increased (Examples 1, 2 and 4).

The present application claims the priority to Japanese Patent Application No. 2010-196625, filed Sep. 2, 2010, the disclosure of which is incorporated herein by reference in its entirety.

Hitherto, the invention of the present application has been described with reference to the exemplary embodiment and Examples, but the invention of the present application is not limited to the above-mentioned exemplary embodiment and Examples. In the constitutions and details of the invention of the present application, various changes which are understood by a person skilled in the art can be made within the scope of the invention.

INDUSTRIAL APPLICABILITY

The present exemplary embodiment can be utilized in every industrial field necessitating an electric power source, and industrial fields related to the transportation, storage, and supply of electric energy. Specifically, the present exemplary embodiment can be utilized in electric power sources for mobile devices such as cell phones and notebook personal computers; electric power sources for movement and transportation media including electric vehicles such as electric cars, hybrid cars, electric motorbikes and electric assist bicycles, and electric trains, satellites and submarines; backup electric power sources such as UPS; electric power storage facilities to store electric power generated by photovoltaic power generation, wind power generation and the like; and the like.

The Description Of Reference Marks a: negative electrode
b: separator
c: positive electrode
d: negative electrode current collector
e: positive electrode current collector
f: positive electrode terminal
g: negative electrode terminal

What is claimed is:

1. A secondary battery comprising an electrode assembly in which a positive electrode and a negative electrode are arranged to face each other, an electrolyte liquid and a package accommodating the electrode assembly and the electrolyte liquid,
    wherein the negative electrode is formed by binding a negative electrode active substance comprising silicon (a), a silicon oxide (b) and a carbon material (c) capable of occluding and releasing lithium ions, to a negative electrode current collector, with a negative electrode binder,
    the electrolyte liquid comprises a supporting salt and an electrolytic solvent,
    the electrolytic solvent comprises at least one phosphate ester compound selected from the group consisting of phosphite esters, phosphonate esters and bisphosphonate esters,
    the content of the phosphate ester compound is 40% by mass or more in the electrolytic solvent, and
    the electrolytic solvent further comprises a fluorinated carbonate.

2. The secondary battery according to claim 1, wherein the phosphite esters, the phosphonate esters and the bisphosphonate esters are represented by the following general formulas (1) to (3), respectively:

(1)

wherein $R_1$ to $R_3$ denote each independently a substituted or unsubstituted alkyl group, a substituted or unsubstituted aryl group, or a substituted or unsubstituted silyl group,

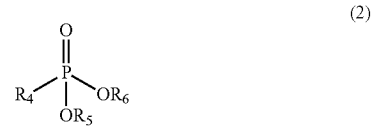

(2)

wherein $R_4$ denotes hydrogen atom or a substituted or unsubstituted alkyl group, $R_5$ and $R_6$ denote each independently a substituted or unsubstituted alkyl group, a substituted or unsubstituted aryl group, or a substituted or unsubstituted silyl group,

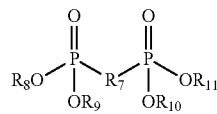

(3)

wherein $R_7$ denotes an alkylene group, $R_8$ to $R_{11}$ denote each independently a substituted or unsubstituted alkyl group, a substituted or unsubstituted aryl group, or a substituted or unsubstituted silyl group.

3. The secondary battery according to claim 1, wherein the fluorinated carbonate is a fluorinated cyclic carbonate.

4. The secondary battery according to claim 3, wherein the fluorinated cyclic carbonate is fluoro-ethylene carbonate.

5. The secondary battery according to claim 1, wherein a content of the fluorinated carbonate is 0.1-10% by mass in the electrolytic solvent.

6. The secondary battery according to claim 1, wherein the electrolytic solvent further comprises a carbonate other than the fluorinated carbonate.

7. The secondary battery according to claim 1, wherein the electrolytic solvent further comprises a phosphate ester.

8. The secondary battery according to claim 1, wherein a content of the supporting salt is 0.8-3.0 M in the electrolyte liquid.

9. The secondary battery according to claim 1, wherein the whole or a part of the silicon oxide (b) has an amorphous structure.

10. The secondary battery according to claim 1, wherein the whole or a part of silicon (a) is dispersed in the silicon oxide (b).

11. The secondary battery according to claim 1, wherein the negative electrode binder is a polyimide or a polyamideimide.

12. The secondary battery according to claim 1, wherein the electrode assembly has a plane shape layered structure, and the package is a laminate film.

13. The secondary battery according to claim 1, wherein the package is an aluminum laminate film.

\* \* \* \* \*